Sept. 19, 1961  G. J. KUMMETH, SR  3,000,646
COLLAPSIBLE STROLLER
Filed July 15, 1960  2 Sheets-Sheet 1

INVENTOR.
GEORGE J. KUMMETH, SR.
BY
Merchant & Merchant
ATTORNEYS

Sept. 19, 1961  G. J. KUMMETH, SR  3,000,646
COLLAPSIBLE STROLLER

Filed July 15, 1960  2 Sheets-Sheet 2

INVENTOR.
GEORGE J. KUMMETH, SR.
BY
Merchant & Merchant
ATTORNEYS

United States Patent Office 3,000,646
Patented Sept. 19, 1961

3,000,646
COLLAPSIBLE STROLLER
George J. Kummeth, Sr., Owatonna, Minn., assignor to Kummeth Mfg. Co., Owatonna, Minn., a corporation of Minnesota
Filed July 15, 1960, Ser. No. 43,143
4 Claims. (Cl. 280—41)

This invention relates generally to carriages for children, and more particularly to a new and useful collapsible stroller.

An object of my invention is the provision of a collapsible stroller which has locking mechanism that is extremely easy to move from the operative position to the inoperative collapsed position and which requires the use of only a minimum amount of effort to engage or disengage the same.

Another object of this invention is the provision of said novel lock mechanism which has generally automatic operation upon the correct movement of the supporting member to which it is attached.

Another object of my invention is the provision of a collapsible stroller which automatically relocks upon movement of the handle to its normal operative position.

A further object of my invention is the provision of a collapsible stroller which is provided with a duo-mechanism for releasing the stroller from its operative position to its collapsed position, which mechanism has generally similar and independently operative locks which facilitate the accomplishment of said releasing action without requiring the user to simultaneously and awkwardly reach both remotely positioned locking mechanisms.

A still further object of my invention is the provision of a collapsible stroller which is so constructed that when leverage is applied to its handle for lifting it over curbs or other obstacles the leverage is not transmitted through the locking mechanism, but it transmitted directly to the frame of the stroller. This innovation of my stroller is particularly significant in regard to the sturdiness and stability of the structure.

Another object of my invention is the provision of a collapsible stroller which, in a modified embodiment, has a handle adjustable by means associated with the stroller locking mechanism.

Another object of my invention is the provision of a collapsible stroller which is simple in design, durable and strong in structure, and which may be economically manufactured.

The above and still further objects of my invention will become apparent from the following detailed specification, appended claims and attached drawings.

Referring to the drawings wherein like characters indicate like parts throughout the several views.

Figure 1:
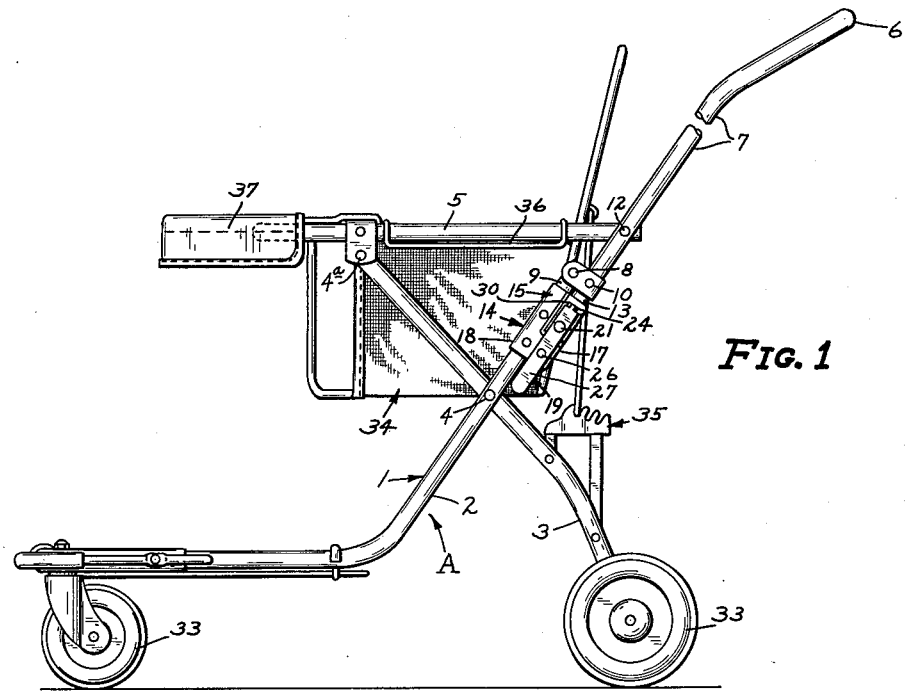
FIG. 1 is a view in side elevation of my novel stroller in its operative position.
Figures 2, 3:
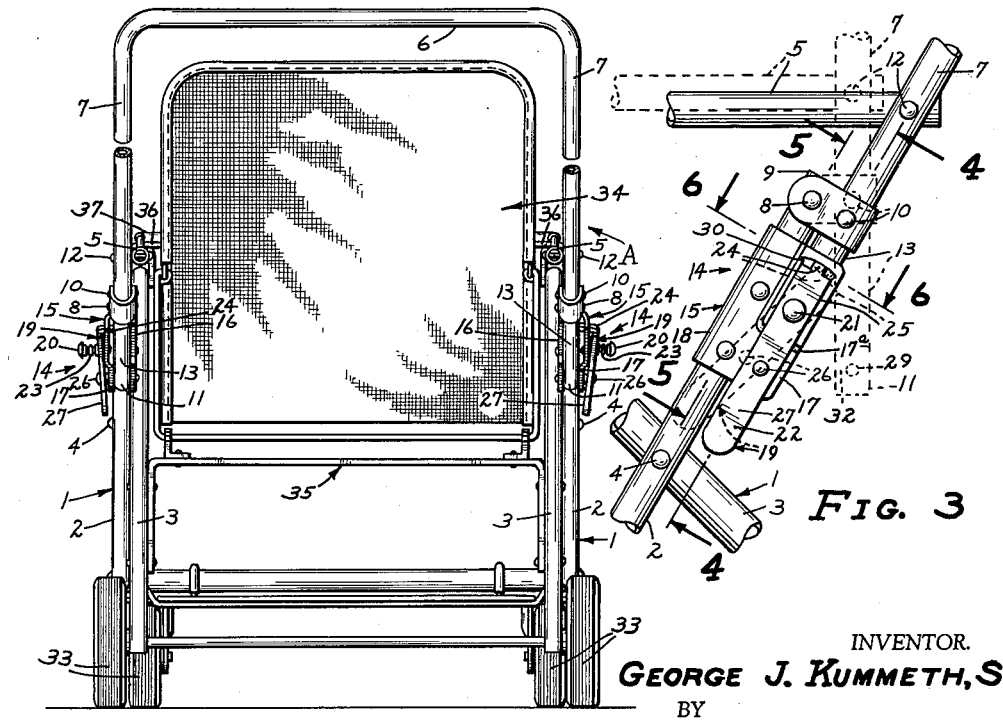
FIG. 2 is a view in rear elevation of my novel stroller in its operative position, some parts broken away, and some parts shown in section.
FIG. 3 is an enlarged fragmentary view in side elevation of the locking mechanism thereof, the same in its partially collapsed position being shown in dotted lines.
Figure 4:
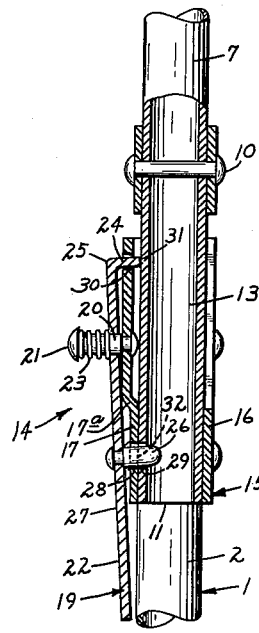
FIG. 4 is a fragmentary sectional view taken on the line 4—4 of FIG. 3, some parts being broken away.
Figure 5:
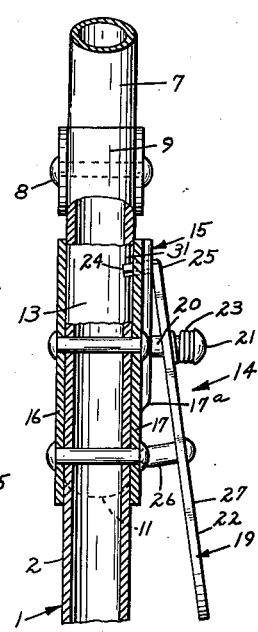
FIG. 5 is a fragmentary sectional view taken on the line 5—5 of FIG. 3 of the parts as shown in the dotted line positions of FIG. 3, some parts being broken away.
Figure 6:
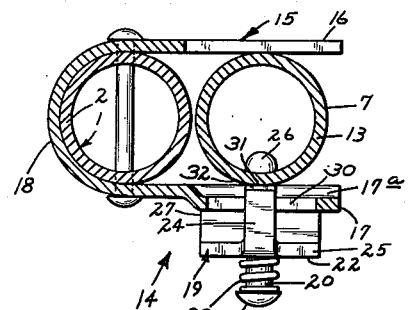
FIG. 6 is a view in section taken on the line 6—6 of FIG. 3.

Referring with greater particularity to the drawings, the reference letter A represents the stroller in its entirety. A pair of collapsible upright side frames, which are laterally spaced in generally parallel relationship to one another, are each represented generally by the reference numeral 1. Each of the side frames 1 is generally X-shaped and includes a rigid upwardly and rearwardly extending member 2 and a rigid upwardly and forwardly extending member 3, which are pivotally connected together at their points of intersection by a suitable pin 4 disposed on a horizontal axis common to the other side frame 1. A generally U-shaped horizontally disposed upper frame member 5 connects the corresponding upwardly and forwardly extending members 3 of the opposite side frames 1 together in lateral alignment and for common pivotal movements, as at 4a. The pivotally connected members 2, 3 of the side frames 1 are pivotally movable from an operative position wherein they are disposed at maximum angles to one another to an inoperative collapsed position, not shown, wherein they are disposed at materially reduced angles to one another.

An inverted U-shaped handle 6, defining laterally spaced depending legs 7, is provided. Each leg 7 of said handle 6 is pivotally connected as at 8, to the upper end 9 of the upwardly and rearwardly extending member 2 of an opposite side frame 1 at a point 10 spaced materially from the lower end 11 of said leg 7. The legs 7 are also pivotally connected, as at 12, to the upper frame member 5 at a point spaced above the aforesaid pivotal connection 8 of the legs 7 to the side frames 1. The portions of the opposite legs 7 of said handle 6 disposed below the pivotal connection 8 thereof to said side frames 1 define depending foot portions 13. The foot portions 13 of said legs 7 are disposed behind their respective upwardly and rearwardly extending members 2 of the side frames 1. The handle 6 is therefore pivotally movable between an operative position wherein the foot portions 13 are generally parallel to the upwardly and rearwardly extending members 2 of the associated side frames 1 to an inoperative collapsed position wherein they are disposed in generally parallel relation to the upwardly and forwardly extending members 3 of their respective side frames 1.

For the purpose of securing the stroller A in the abovementioned operative position and also for the purpose of easily releasing same to said inoperative collapsible position, not shown, a pair of substantially identical and individually releasable latches, each represented generally by the numeral 14, are provided. Each of said latches 14 is associated with a different side frame 1, and includes a cross-sectionally generally inverted U-shaped plate, represented generally by the numeral 15, which is disposed in a plane generally parallel to said side frames 1. Each of the plates 15 define inner 16 and outer 17 side portions which depend from the U-shaped portion 18 thereof. The outer side portion 17 is offset outwardly as shown at 17a, so as to provide room for a mounting pin 20 to be secured thereto, as will hereinafter be explained. The U-shaped portions 18 of the respective plates 15 are secured to the associated upwardly and rearwardly extending members 2 of the respective side frames 1 intermediate the axis of pivotal connection between the crossed members 2, 3 and the pivotal connections 8 of the handle 6 thereto. The plates 15 are secured so that the side portions 16, 17 thereof extend rearwardly from the respective upwardly and rearwardly extending frame members 2, 3 whereby they cooperate to limit lateral movement of said foot portions 13 of the handle 6 when the parts are cooperatively positioned. Each of said latches 14 further includes an elongated latch arm 19 intermediately pivotally mounted by a mounting pin 20 onto the outer side portion 17 of the respective plate 15 for the allowance of axial movement and rocking movements in a plane generally radial of the axis of the mounting pin 20. Each of the mounting pins 20 has a head 21 spaced outwardly from the outer surface 22 of the respective arm 19 with suitable yielding means, preferably and as shown comprising a compression spring 23, spaced therebetween for urging said arm 19 in a direction toward said plate 15. Each of the latch arms 19 defines a first detent 24 projecting inwardly from its upper end 25 and a second detent 26 projecting inwardly from its lower end 27. Each of the plates 15 and the associated foot portion 13 of the handle 6 have alignable apertures 28 and 29, respectively, for receiving the second detent 26 when the latches 14 and the handle 6 are in the operative position. An aperture 30 is spaced upwardly in each of the plates 15 in alignment with and for the reception of the respective first detents 24. Each pair of apertures 28, 29 are disposed so that they lie in the arc of swing of the second detents 26. Each of the first detents 24 lies in the path of travel of the corresponding foot portion 13 of the handle 6 whereby it is urged into abutment with an adjacent surface 31 of the corresponding foot portion 13 when the parts are operatively positioned. As between each of the second detents 26 and its respective foot portion 13 of the handle 6, it is necessary that one of them define a cam surface, preferably being merely the annular surface 32 of the handle 6, for causing outward movement of the second detent 26 whereby to allow it to ride along the surface 32 of the foot portion 13 until it will fall into the aperture 29 therein when in the operative position.

Suitable ground wheels 33 are connected to the respective side frames 1. A seat, represented generally by the numeral 34, is also secured to the side frames 1 by an adjustable bracket, represented generally by the numeral 35, and also to the upper frame member 5 by the arms 36. A tray 37 is also attached to the upper frame member 5 by suitable means, not shown.

Figure 7:
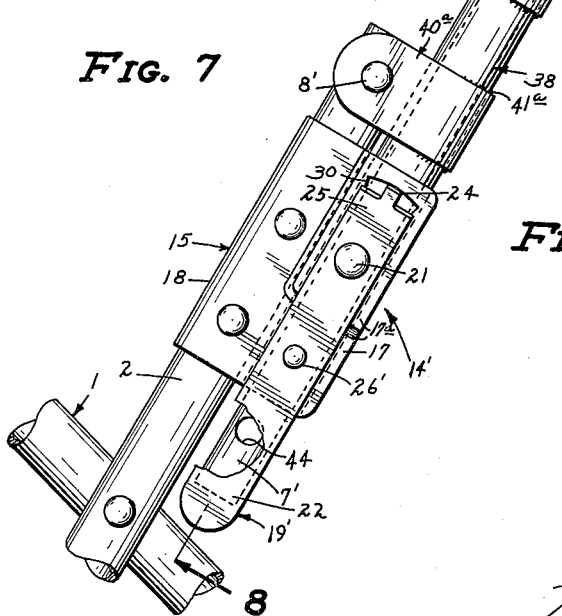
FIG. 7 is an enlarged view corresponding to FIG. 3 and showing an alternative embodiment of my invention.
Figure 8:
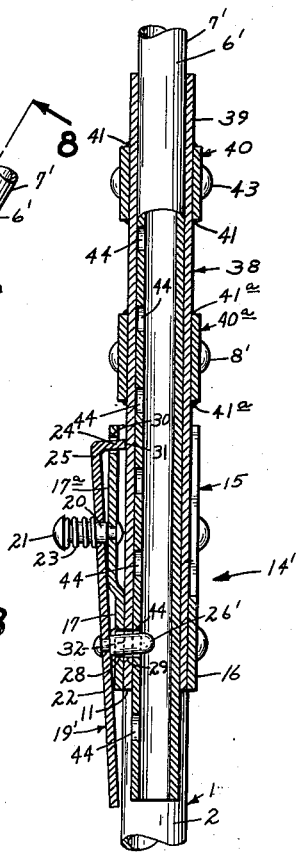
FIG. 8 is a view in section taken on the line 8—8 of FIG. 7.

FIGS. 7 and 8 disclose an alternative embodiment of my invention in which a U-shaped handle 6', having depending legs 7', is disposed so as to be vertically adjustable. Each leg 7' is slidably received within a tube 38, which is disposed with respect to a latch 14' in the same manner as the foot portion 13 in the preferred embodiment. The upper end 39 of the tube 38 is pivotally connected to the upper frame member 5' by means of a U-shaped bracket 40, which is rigidly secured, as by welding at 41, to the tube 38, the free ends 42 of the bracket 40 being pivotally connected, as at 43, to the frame member 5'. The tube 38, at a point below the bracket 40, is also pivotally connected as at 8', to the upper end 9 of the upwardly and rearwardly extending member 2 by welding, as at 41a, a second U-shaped bracket 40a to the tube 38. The latch 14' is similar to and operates in the same manner as the latch 14 of the preferred embodiment. Each leg 7' has a plurality of longitudinally spaced outwardly opening apertures 44, which selectively receive the second detent 26' of the latch arm 19' so as to provide means for adjusting the height of the handle 6'. Each leg 7' is received within the tube 38 snugly enough to produce a working fit so that the handle 6' will not slip from its own weight when the latch 14' is released to collapse the stroller A. This embodiment of my invention corresponds in all other respects to the preferred embodiment of my invention as first above described, the corresponding parts being so numbered.

The operative simplicity of my invention, being of utmost importance, should be noted. When the second detents 26 of the latch arms 19 project through the apertures 28 in the plates 15 and are received in the apertures 29 in the respective foot portions 13 of the handle 6, the stroller A is in its operative position. When it is desired to place the stroller A in its inoperative collapsed position, either one of the latch arms 19 is biased outwardly to remove the second detent 26 from the apertures 28, 29 and abut it against the side 17 of the plate 15. When this is done, the spring 23 pushes the first detent 24 to project through the aperture 30 in the plate 15. Then, the latch 14 on the opposite side is likewise and independently disengaged; the first one remaining disengaged without being held in the meantime. After both latches 14 are unlocked, pressure is applied forwardly to the handle 6 and the stroller assumes the collapsed position. When it is desired to return the stroller A to its operative position, the handle 6 is lifted and moved rearwardly, and the latches 14 become automatically engaged. When the handle 6 nears its operative position, the foot portions 13 thereof hit the respective first detents 24 at the cam surface 31 and thereby cause the second detents 26 to snap back into the apertures 28 in the plates 15. The second detents 26 thereafter project through the plates 15 and ride over the foot portions 13 at the cam surface 32 of the handle 6 until they snap back into the apertures 29 in the foot portions 13.

With respect to operation of the alternative embodiment, the presence of the legs 7' within the tubes 38 in no way alters the collapsing operation of the stroller A as described above. When it is desired to adjust the height of the handle 6' the latch arms 19' are disengaged and the handle 6' moved so that the desired apertures 44 are alignable with the second detents 26', and the latch arms 19' are thereafter moved to engage the legs 7'.

This invention has been thoroughly tested and found to be completely satisfactory for the accomplishment of the above objects; and while I have shown a preferred embodiment thereof, I wish it to be specifically understood that same may be modified without departure from the scope and spirit of the appended claims.

What I claim is:

1. In a collapsible stroller, a laterally spaced generally parallel pair of collapsible upright side frames, said side frames being generally X-shaped and each comprising a rigid upwardly and rearwardly extending member and a rigid upwardly and forwardly extending member pivotally connected together at their points of intersection on a horizontal axis common to the other side frame, means connecting corresponding members of opposite side frames together in lateral alignment and for common pivotal movements, the pivotally connected members of the side frames being pivotally movable from an operative position wherein they are disposed at maximum angles to one another to an inoperative collapsed position wherein they are disposed at materially reduced angles to one another, an inverted U-shaped handle defining laterally spaced depending legs, each leg of said handle being pivotally connected to an upwardly and rearwardly extending member of an opposite side frame at a point spaced materially from the lower end of said leg and above the before-mentioned axis, the portions of the opposite legs of said handle disposed below the said pivotal axis thereof defining depending foot portions disposed behind those portions of their respective upwardly and rearwardly extending members of the side frames, said handle being pivotally movable between an operative position wherein its said foot portions are generally parallel to the upwardly and rearwardly extending members of their associated side frames and an inoperative collapsed position wherein they are angularly disposed with respect to said last mentioned members, substantially identical individually releaseable latches each associated with a different side frame for normally retaining its respective side frame and handle in their respective operative positions, said latches each comprising a plate associated with a different side frame and disposed in a plane generally parallel thereto, said plate being secured on and extending rearwardly from a portion of the upwardly and rearwardly extending member of its respective side frame intermediate the axis of pivotal connection between the crossed members of its respective side frame and the axis of pivotal connection of the handle thereto, an elongated latch arm intermediately pivotally mounted on the outer side of said plate for axial movement and for rocking movement in a plane generally radial of said mounting axis, a mounting pin securing said arm to said plate and having a head spaced from the outer surface of said arm with yielding means therebetween urging said arm in a direction toward said plate, said latch arm having a first inwardly projecting detent spaced upwardly from said mounting pin and a second inwardly projecting detent spaced downwardly from said mounting pin, said plate and said foot portion having alignable apertures for receiving said second detent when said latch and said handle are in the operative position, said first detent lying in the path of travel of said foot portion of said handle whereby it is urged into abutment with an adjacent surface of said foot portion when operatively positioned, as between said second detent and said foot portion of said handle one defines a cam surface causing outward movement of said second detent to allow insertion into the aperture in said front portion when in the operative position, and ground wheels associated with the lower ends of the pivotally connected members of opposite side frames.

2. The structure defined in claim 1 in which each of said plates comprises a cross-sectionally generally inverted U-shaped portion and spaced depending inner and outer side portions, said latch arms being mounted to said outer side portions, said U-shaped portions of said plates being secured to said upwardly and rearwardly extending members of said side frames, and said depending side portions of said plates cooperating to limit lateral movement of said foot portions of said handle when the parts are operatively positioned.

3. In a collapsible stroller, a laterally spaced generally parallel pair of collapsible upright side frames, said side frames being generally X-shaped and each comprising a rigid upwardly and rearwardly extending member and a rigid upwardly and forwardly extending member pivotally connected together at their points of intersection on a horizontal axis common to the other side frame, means connecting corresponding members of opposite side frames together in lateral alignment and for common pivotal movements, the pivotally connected members of the side frames being pivotally movable from an operative position wherein they are disposed at maximum angles to one another to an inoperative collapsed position wherein they are disposed at materially reduced angles to one another, an inverted U-shaped handle defining laterally spaced depending legs, a pair of elongated tubes one each slidably receiving each of said legs, each of said tubes being pivotally connected to an upwardly and rearwardly extending member of an opposite side frame at a point spaced materially from the lower end of said tubes and above the before-mentioned axis, said tubes being disposed behand those portions of their respective upwardly and rearwardly extending members of the side frames, said handle being pivotally movable between an operative position wherein said tubes and said legs of said handle received therein are generally parallel to the upwardly and rearwardly extending members of their associated side frames and an inoperative collapsed position wherein they are angularly disposed with respect to said last mentioned members, substantially identical individually releaseable latches each associated with a different side frame for normally retaining its respective side frame and handle in their respective operative positions, said legs of said handle each defining means associated with said latches for coupling said legs to said tubes and for selectively adjusting the height of said handle, said latches each comprising a plate associated with a different side frame and disposed in a plane generally parallel thereto, said plate being secured to and extending rearwardly from a portion of the upwardly and rearwardly extending member of its respective side frame intermediate the axis of pivotal connection between the crossed members of its respective side frame and the axis of pivotal connection of the tube thereto, an elongated latch arm intermediately pivotally mounted on the outer side of said plate for axial movement and for rocking movement in a plane generally radial of said mounting axis, a mounting pin securing said arm to said plate and having a head spaced from the outer surface of said arm with yielding means therebetween urging said arm in a direction toward said plate, said latch arm having a first inwardly projecting detent spaced upwardly from said mounting pin and a second inwardly projecting detent spaced downwardly from said mounting pin, said plate and said tube having alignable apertures for receiving said second detent when said latch and said handle are in the operative position, said first detent lying in the path of travel of said tube whereby it is urged into abutment with an adjacent surface of said tube when operatively positioned, as between said second detent and said tube one defines a cam surface causing outward movement of said second detent to allow insertion into the tube aperture in said tube when in the operative position, and ground wheels associated with the lower ends of the pivotally connected members of opposite side frames.

4. A latch and connecting mechanism comprising a pair of elongated support members pivotally connected to one another at a point spaced materially from one end of said support members, a portion of said one support member disposed below the pivotal axis thereof defining a depending foot portion, said one support member being pivotally movable with respect to the other support member between an operative position wherein its said foot portion is generally parallel to said other support member and an inoperative collapsed position wherein said one support member is disposed angularly with respect to said other support member, a latch associated with said support member for normally retaining the same in said operative position, said latch comprising a plate secured on and extending from said other support member in adjacent relationship to said foot portion of said one support member, an elongated latch arm intermediately pivotally mounuted on one side of said plate for axial movement and for rocking movement in a plane generally radial of said mounting axis, a mounting pin securing said arm to said plate and having a head spaced from the outer surface of said arm with yielding means therebetween urging said arm in a direction toward said plate, said latch arm having a first inwardly projecting detent spaced in one direction from said mounting pin and a second inwardly projecting detent spaced in an opposite direction from said mounting pin, said plate and said foot portion of said one support member having alignable apertures for receiving said second detent when said latch and said support members are in the operative position, said first detent lying in the path of travel of said foot portion of said support member whereby it is urged into abutment with an adjacent surface of said foot portion when operatively positioned, as between said second detent and said foot portion one defines a cam surface causing outward movement of said second detent so as to permit insertion thereof into the aperture in said foot portion when in the operative position.

References Cited in the file of this patent

UNITED STATES PATENTS

| | | |
|---|---|---|
| 2,063,242 | Graser | Dec. 8, 1936 |
| 2,226,000 | Kroll | Dec. 24, 1940 |
| 2,241,799 | Welsh | May 13, 1941 |